(12) United States Patent
Shoji

(10) Patent No.: US 7,431,359 B2
(45) Date of Patent: Oct. 7, 2008

(54) BUMPER COLLISION SENSOR

(75) Inventor: Rihito Shoji, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 427 days.

(21) Appl. No.: 11/272,821

(22) Filed: Nov. 15, 2005

(65) Prior Publication Data

US 2006/0131898 A1 Jun. 22, 2006

(30) Foreign Application Priority Data

Dec. 17, 2004 (JP) ............................. 2004-365693

(51) Int. Cl.
*B60R 27/00* (2006.01)

(52) U.S. Cl. ....................................................... 293/3

(58) Field of Classification Search ................. 293/102, 293/3

See application file for complete search history.

(56) References Cited

U.S. PATENT DOCUMENTS 7,104,354 B2 * 9/2006 Ozaki ........................ 180/282

FOREIGN PATENT DOCUMENTS

| GB | 2 243 933 | 11/1991 |
|---|---|---|
| JP | 2004-276885 | 10/2004 |
| WO | 01/23224 | 4/2001 |

* cited by examiner

*Primary Examiner*—Lori L Lyjak
(74) *Attorney, Agent, or Firm*—Wenderoth, Lind & Ponack, L.L.P.

(57) ABSTRACT

A bumper collision sensor can detect collision without hurting a pedestrian even if a bumper is deformed significantly. The bumper collision sensor includes a wire, a tension sensor, and a substrate. The wire has an extendable portion in a part thereof. The tension sensor is connected to one end of the wire. The substrate is mounted with the tension sensor and the wire and is attached, with plasticity, to the bumper. The tension sensor is fixed to one end of the substrate. The wire is arranged in the tension sensor along a longitudinal direction of the substrate with a stress equal to or lower than a value set in advance. The other end of the wire is fixed to the substrate.

19 Claims, 13 Drawing Sheets

BUMPER COLLISION SENSOR

BACKGROUND OF THE INVENTION

1. Field of the Invention

The present invention generally relates to a bumper collision sensor for an automobile and the like for detecting collision with a pedestrian.

2. Description of the Related Art

In recent years, from the viewpoint of protection of pedestrians in traffic accidents, there has been a worldwide tendency toward the establishment of pedestrian protection rules for automobiles. The rules aim at reducing a degree of injuries suffered by a pedestrian when an automobile collides with the pedestrian. Various pedestrian protection systems have been conventionally proposed. For example, there are a system for, when collision with a pedestrian is detected, lifting a hood to prevent a head of the pedestrian from colliding with a hard engine unit and a system for, when collision with a pedestrian is detected, expanding an airbag over a hood. These systems attract attention as systems for actively reducing head injuries of pedestrians and are developed extensively.

These pedestrian protection systems require a bumper collision sensor for detecting collision with a pedestrian. As such a bumper collision sensor, a bumper collision sensor using a load sensor is proposed. A plan view of the load sensor is shown in FIG. 14 and an output waveform chart of the load sensor is shown in FIG. 15.

In FIG. 14, load sensor 1 includes sensor cells 1b that are formed on belt-like sensor film 1a by screen printing or the like. When a load is applied to sensor cells 1b, a voltage, which is an output of sensor cells 1b, changes in proportion to a magnitude of the load. Plural sensor cells 1b are formed substantially at equal intervals in a longitudinal direction of sensor film 1a. Load sensor 1 with such a constitution is arranged in a longitudinal direction of a bumper of an automobile.

When the automobile collides with a pedestrian, a load corresponding to impact caused by the collision is applied to load sensor 1 arranged in the bumper. As shown in FIG. 15, a sensor output rapidly increases when the automobile collides with the pedestrian but then rapidly decreases when the pedestrian is sent flying. Therefore, a waveform of the sensor output has a peak when the automobile collides with the pedestrian. In this case, the peak is large when the automobile collides with an adult and is small when the automobile collides with a child.

On the other hand, when the automobile collides with a fixed object such as a wall or a pillar, a sensor output rapidly increases and then a load continues to be applied to the sensor cells 1b because the fixed object is never sent flying. As a result, as a waveform of the sensor output, the sensor output continues to increase gently without decreasing.

Consequently, load sensor 1, which is the conventional bumper collision sensor, can not only detect collision but also judge whether a collision object is a human or an object according to whether a peak value in time width T in FIG. 15 is in an output range for a human (between S1 to S2).

The conventional constitution is disclosed in JP-A-2004-276885.

However, although it is certainly possible to detect collision distinguishing a human and an object by using load sensor 1 in the bumper collision sensor, it is necessary to accurately obtain a waveform shown in FIG. 15 for the detection. Therefore, load sensor 1 has to be firmly fixed to the bumper.

On the other hand, from the viewpoint of pedestrian protection, in order to reduce damage to the legs of a colliding pedestrian to which damage are applied first, a shock absorbing structure, which is adapted to be easily deformed, tends to be adopted for a bumper. It is known that an amount of deformation of the bumper at the time when a pedestrian collides with the bumper is about a diameter of a femoral region of one leg. This is equivalent to about 15 to 20 cm in a standard physique.

Since load sensor 1 firmly fixed to the bumper is a belt-like sensor consisting of sensor films 1a, when load sensor 1 is subjected to such deformation due to collision, it is likely that load sensor 1 is broken during the deformation of the bumper if load sensor 1 is stretched on the order of several tens of centimeters. As a result, it is likely that a sensor output is interrupted during measurement of the waveform shown in FIG. 15 to make it impossible to detect collision.

To cope with the problem, it is conceivable to make sensor films 1a strong such that sensor films 1a are not broken. In this case, load sensor 1 is not deformed even if the bumper is deformed at the time of collision of a pedestrian. Thus, it is likely that load sensor 1 will hurt the legs of the pedestrian. When sensor film 1a is made of a soft material such as rubber, sensor cells 1b move according to deformation of the bumper. This could make it hard to measure an accurate load.

SUMMARY OF THE INVENTION

The invention provides a bumper collision sensor that can detect collision without hurting a pedestrian even if a bumper and a substrate are deformed significantly.

The bumper collision sensor of the invention includes a wire having an extendable portion in a part thereof, a tension sensor connected to one end of the wire, and a substrate that is mounted with the tension sensor and the wire and attached, with plasticity, to a bumper. The tension sensor is fixed to one end of the substrate. The wire is arranged in the tension sensor along a longitudinal direction of the substrate with a stress equal to or lower than a value set in advance. The other end of the wire is fixed to the substrate.

DETAILED DESCRIPTION OF THE PREFERRED EMBODIMENTS

Embodiments of the invention will be hereinafter explained with reference to the accompanying drawings.

First Embodiment

Figure 1:
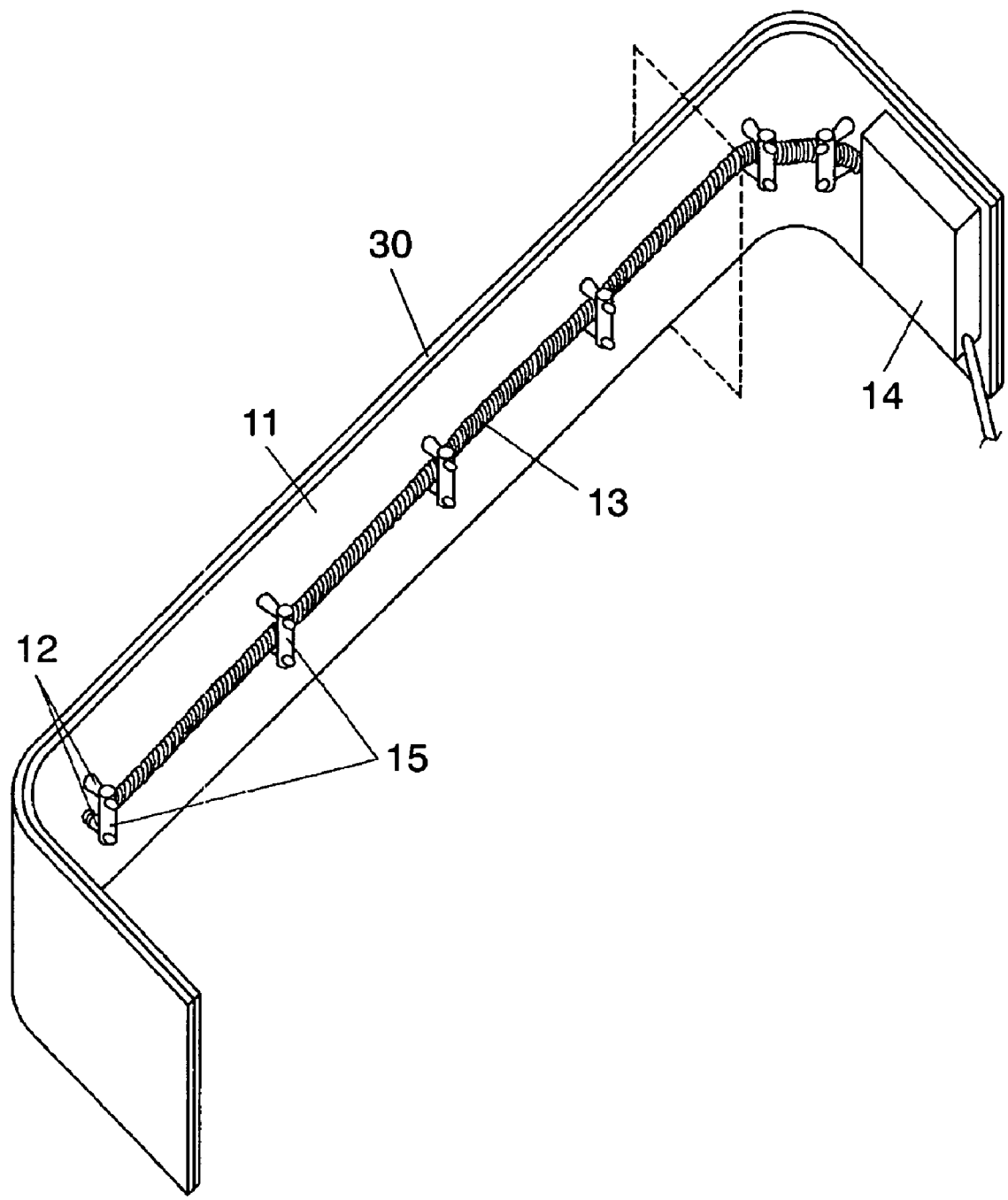
FIG. 1 is a schematic perspective view of a bumper collision sensor in a first embodiment of the invention.
Figure 2A:
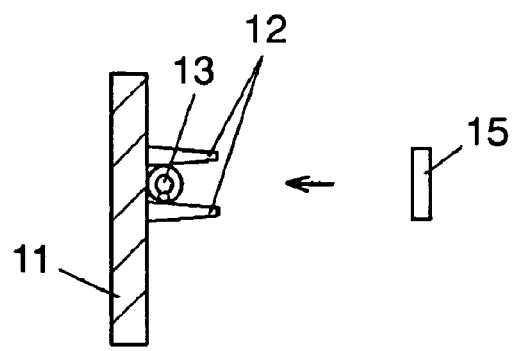
FIG. 2A is a diagram of a state in which a wire is fit in between projections of the bumper collision sensor in the first embodiment.
Figure 2B:
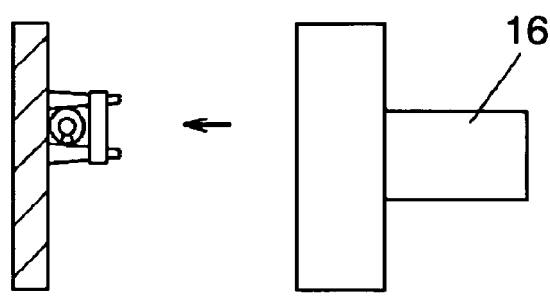
FIG. 2B is a diagram of a state in which a wire holding member is fit inbetween the projections of the bumper collision sensor in the first embodiment.
Figure 2C:
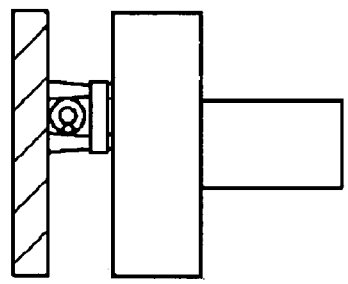
FIG. 2C is a diagram of a state in which heat press is applied to the projections of the bumper collision sensor in the first embodiment.
Figure 2D:
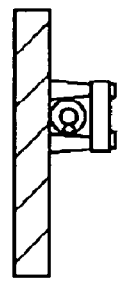
FIG. 2D is a diagram of a state in which integration of the wire holding member in the projections of the bumper collision sensor in the first embodiment is completed.

FIG. 1 is a schematic perspective view of a bumper collision sensor in a first embodiment of the invention. FIG. 2A is a diagram of a state in which a wire is fit in between projections of the bumper collision sensor in this embodiment. FIG. 2B is a diagram of a state in which a wire holding member is fit in between the projections of the bumper collision sensor in this embodiment. FIG. 2C is a diagram of a state in which a heat press is applied to the projections of the bumper collision sensor in this embodiment. FIG. 2D is a diagram of a state in which integration of the wire holding member in the projections of the bumper collision sensor in this embodiment is completed.

Figure 3:
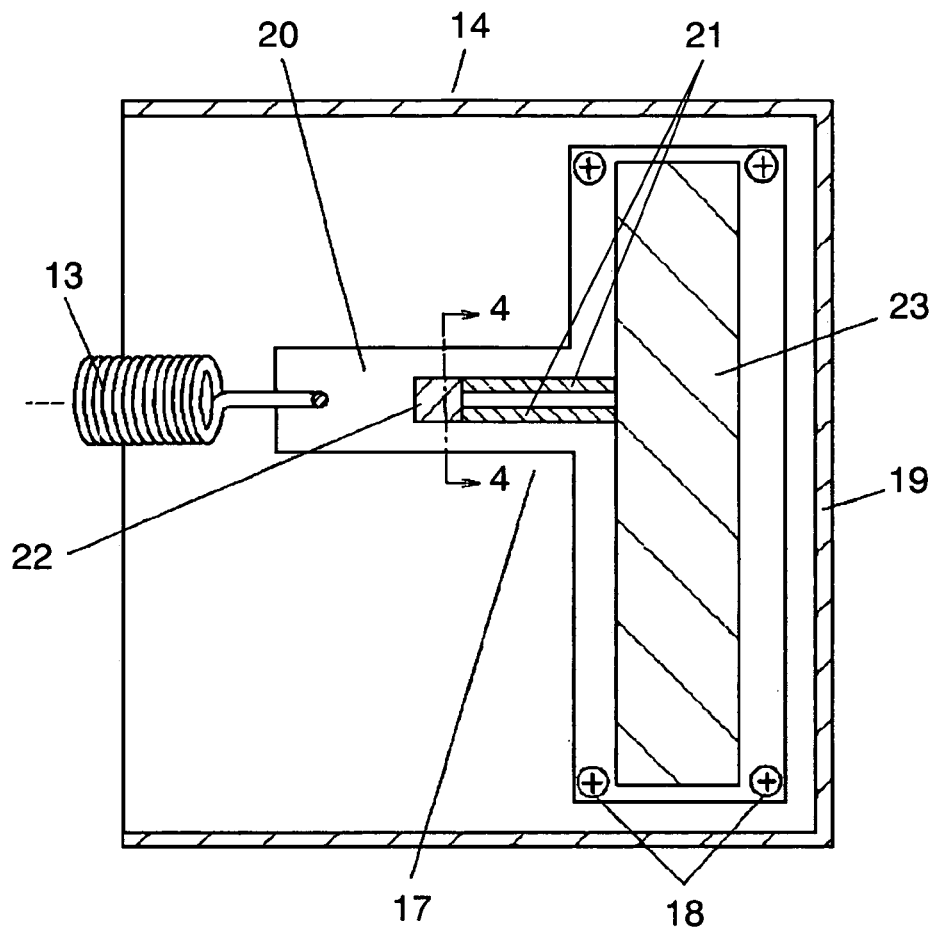
FIG. 3 is a partial sectional view showing a structure of a tension sensor in the bumper collision sensor in the first embodiment.
Figure 4:
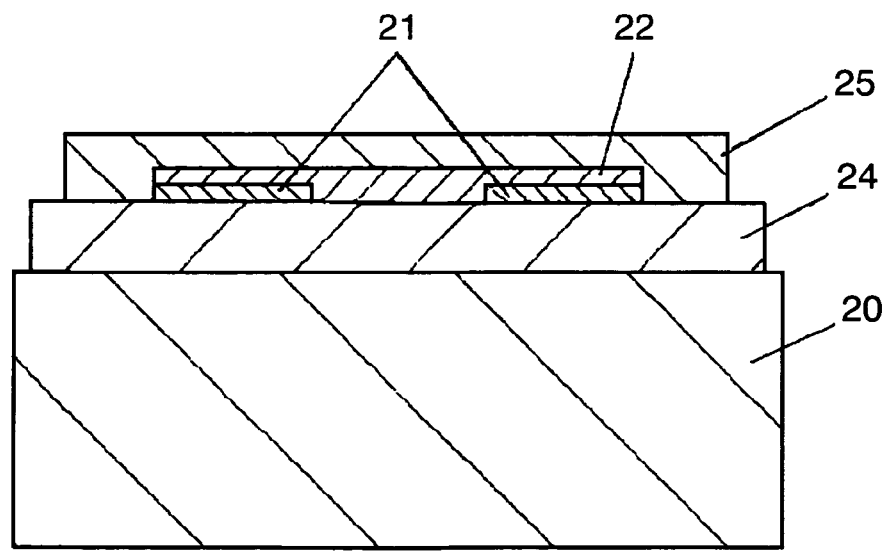
FIG. 4 is a schematic sectional view of a tension detecting unit in the bumper collision sensor in the first embodiment.
Figure 5:
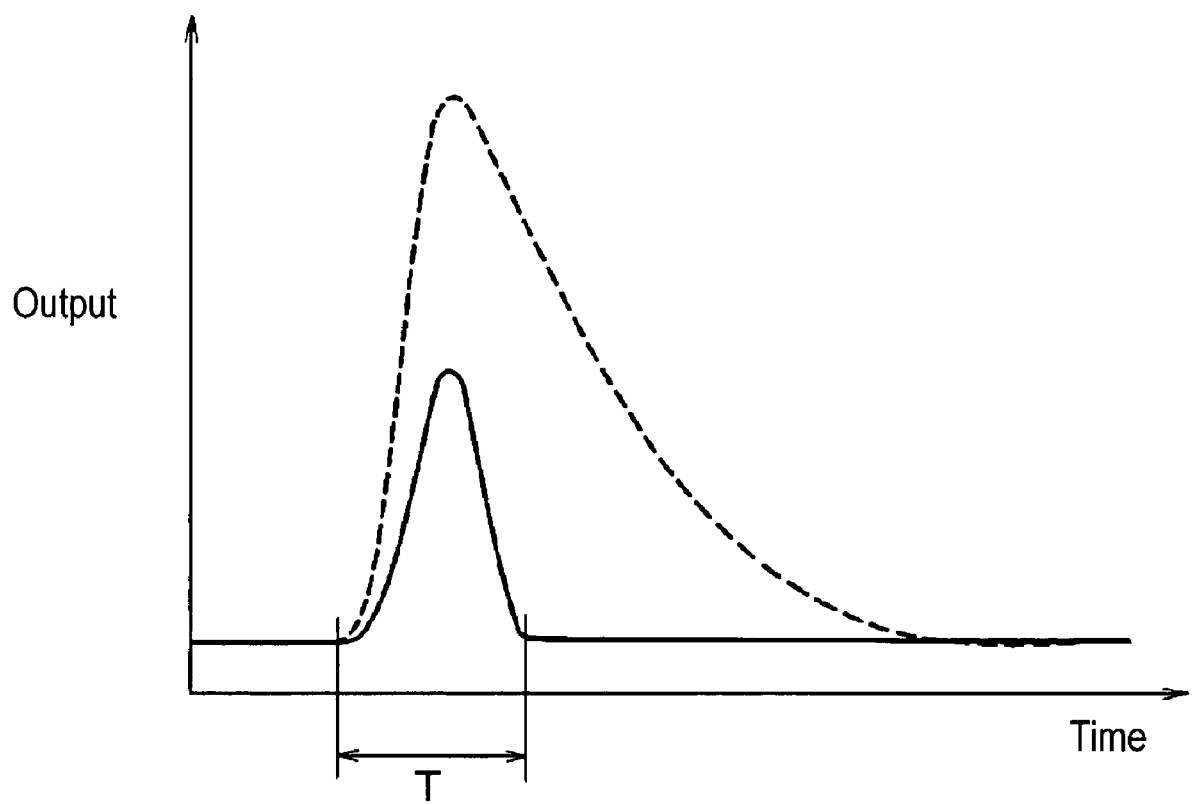
FIG. 5 is a waveform chart showing a changing component after excluding a DC component from an output of the bumper collision sensor in the first embodiment.
Figure 6:
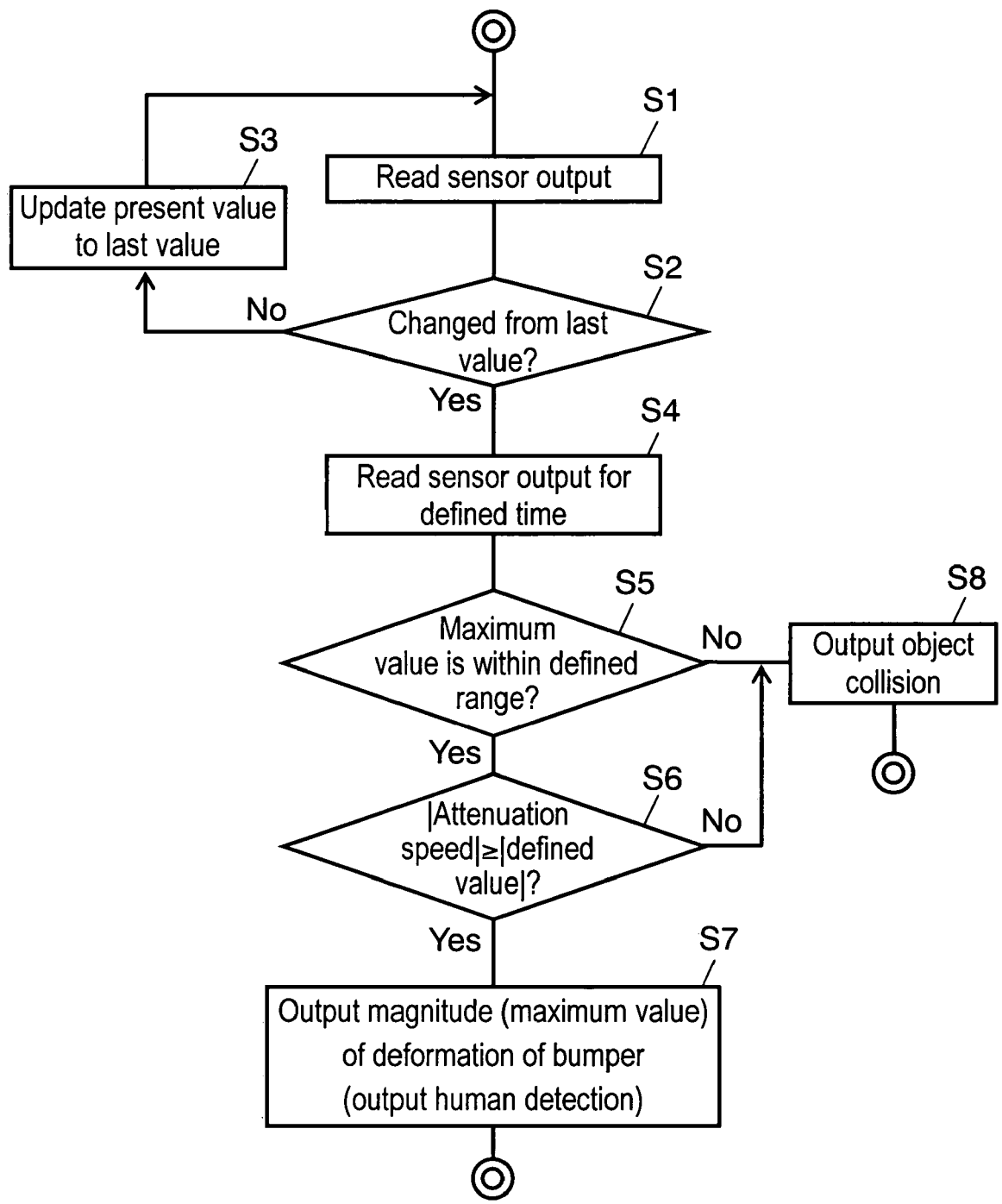
FIG. 6 is a flowchart describing operations of the bumper collision sensor in the first embodiment.

FIG. 3 is a partial sectional view showing a structure of a tension sensor in the bumper collision sensor in this embodiment. FIG. 4 is a schematic sectional view of a tension detecting unit in the bumper collision sensor in this embodiment. FIG. 5 is a waveform chart showing a changing component after excluding a DC component from an output of the bumper collision sensor in this embodiment. FIG. 6 is a flowchart showing operations of the bumper collision sensor in this embodiment.

In FIG. 1, in order to reduce damage to a pedestrian, substrate 11 is molded out of a material having plasticity and integrally attached to bumper 30 also molded out of a material having plasticity with an adhesive or the like. Plural projections 12 formed in a conical shape with a circular section are provided to substrate 11 by integral molding with substrate 11. It is possible to reduce the number of components by integrally molding projections 12 and substrate 11. Thus, it is possible to reduce the likelihood of injuries due to dropping of a component caused by collision with a pedestrian.

Wire 13 consisting of a tension spring of stainless steel is set between two projections 12. The tension spring is equivalent to an extendable portion. In the first embodiment, entire wire 13 is constituted as a tension spring having an extendable part. An interval of projections 12 is set larger than a diameter of wire 13 such that wire 13 is not caught by projections 12. Note that, although a rubber material having elasticity may be adopted as the extendable portion, deterioration under a severe environment of an automobile is a concern. Thus, reliability is improved by adopting a tension spring made of a metal material, in particular, a stainless steel material having excellent durability.

One end of wire 13 is connected to tension detecting unit 17 (shown in FIG. 3) built in tension sensor 14. Tension sensor 14 is fixed to one end of substrate 11. Since this part is on a side not colliding with a pedestrian, the likelihood of breakage of the sensor due to collision is extremely low. The other end of wire 13 is fixed to projections 12 located in a lower left part of FIG. 1 with a part of the tension spring constituting wire 13 fit in projections 12. It is possible to reduce the number of components because a new fixing member is unnecessary by fixing wire 13 in this way. It is also possible to reduce the likelihood of injuries due to dropping of a component caused by collision with a pedestrian.

The length of wire 13 is set to a length connecting fixing projections 12 and tension sensor 14 such that almost no stress is applied to tension sensor 14 when tension sensor 14 is attached as shown in FIG. 1 and the stress is equal to or less than a value set in advance. Consequently, since almost no tension is applied to wire 13, vibration of wire 13 at the time of driving of an automobile is not transmitted to tension sensor 14, leading to improvement of reliability.

An intermediate part of wire 13 is integrated in substrate 11 by fitting wire holding members 15 of a columnar shape having a circular section to projections 12 such that wire 13 does not come off substrate 11. Note that it is likely that, if projections 12 and wire holding members 15 have shapes with corners, wire 13 will be caught by the corners because of deformation of substrate 11 caused by collision, and tension of wire 13 will not be transmitted to tension sensor 14 accurately. Therefore, projections 12 and wire holding members 15 have circular sections in order to reduce the likelihood of such occurrences. Moreover, since there are no corners, it is also possible to reduce the likelihood that projections 12 and wire holding members 15 will hit a pedestrian because of deformation of bumper 30 and substrate 11 to hurt the pedestrian.

A method of integrating wire holding member 15 in projections 12 is shown in FIGS. 2A to 2D. Note that FIGS. 2A to 2D show a section taken at a broken line part in FIG. 1. As shown in FIG. 2A, first, wire 13 is inserted between projections 12. As shown in FIG. 2B, projections 12 are inserted into holes (not shown) of wire holding member 15. As shown in FIG. 2C, heat press 16 is pressed against portions of projections 12 sticking out from wire holding member 15. Consequently, the sticking-out portions are softened and heated and compressed. Finally, as shown in FIG. 2D, heat press 16 is removed to harden the crushed sticking-out portions and fix wire holding member 15 to projections 12. By adopting such a method, it is possible to integrate wire 13 in substrate 11 extremely easily.

Details of tension sensor 14 will be explained with reference to FIGS. 3 and 4. FIG. 4 shows a section of a tension detecting portion of tension detecting unit 17, that is, a section along line 4-4 in FIG. 3. Note that, to facilitate understanding, thickness of a structure formed on stainless steel substrate 20 is exaggerated. Tension detecting unit 17 is fixed to body 19 by screws 18 in tension sensor 14. Tension detecting unit 17 includes stainless steel substrate 20, electrodes 21, strain resistance element 22, detection circuit 23, insulating layer 24 (not shown in FIG. 3), and protective layer 25 (not shown in FIG. 3).

Stainless steel substrate 20 has a cantilever shape as shown in FIG. 3. Insulating paste containing a glass component is formed on stainless steel substrate 20 as insulating layer 24 by printing and sintering. To ensure insulating properties, printing and sintering are performed plural times. Electrodes 21 are formed on the insulating layer 24 by printing and sintering a conductive paste consisting of particulates of a metal component. A silver-palladium metal component is used. A wiring pattern (not shown) of detection circuit 23 is also formed simultaneously.

Strain resistance element 22, a resistance of which changes because of distortion, is formed to overlap parts of electrodes 21 on insulating layer 24 in a part of a surface of a beam of stainless steel substrate 20. Strain resistance element 22 is formed by printing and sintering a thick-film resistor paste containing ruthenium oxide conductive particles and a glass component. Protective layer 25 is formed to cover strain resistance element 22 on the surface of strain resistance element 22. Protective layer 25 is formed by printing and sintering an insulating paste containing a glass component having a sintering temperature lower than that of insulating layer 24. The tension detecting portion of tension detecting unit 17 is constituted in this way. Since all the components are sintered at temperatures far higher than environmental temperatures in use, it is possible to secure extremely high reliability.

Detection circuit 23 is formed in a root portion of the beam of stainless steel substrate 20. Detection circuit 23 is assembled by, after forming protective layer 25, mounting a circuit component (not shown) constituting detection circuit 23 and passing protective layer 25 mounted with the circuit component through a soldering reflow oven. A protective film of resin for protecting the circuit component is applied to the entire surface of detection circuit 23.

By adopting the structure described above, it is possible to constitute tension detecting unit 17 integrated with detection circuit 23 extremely easily. Consequently, in addition to reduction of cost through reduction of the number of components, it is possible to reduce the likelihood of injuries due to dropping of a component caused by collision with a pedestrian. Wire 13 is welded and connected to the vicinity of a distal end of the beam. Since both the beam and wire 13 are made of stainless steel, it is possible to weld the beam and wire 13. Thus, in addition to securing durability of the material itself, it is possible to surely connect the beam and wire 13.

Operations in this embodiment will be explained. In general, when an automobile collides with a pedestrian, no significant injuries are caused when vehicle speed is less than 20 km per hour. The pedestrian is sent flying backward by a hood when vehicle speed exceeds 60 km per hour. Thus, in both the cases, it is difficult to expect an effect even if a pedestrian safety system is driven. Therefore, as a result of reading a vehicle speed signal from a vehicle speed sensor mounted on the automobile, if vehicle speed is 20 to 60 km per hour, the bumper collision sensor of the invention performs operations described below.

When a pedestrian collides with bumper 30, bumper 30 made of aplastic material and substrate 11 integrally fixed to bumper 30 with an adhesive or the like are deformed by about several tens of centimeters. As a result, wire 13 built in substrate 11 is pulled according to the deformation. In this case, since entire wire 13 is made of a tension spring, wire 13 extends without being broken and tension of wire 13 is transmitted to tension detecting unit 17 of tension sensor 14.

Stress is applied to tension detecting unit 17 in a direction in which the beam provided in a part of stainless steel substrate 20 is pulled. As a result, strain resistance element 22 provided on the surface of the beam warps and a resistance thereof changes. This change is electrically detected by detection circuit 23. Detection circuit 23 detects the change in the resistance of strain resistance element 22 as a change in a voltage. In this case, various DC resistance fluctuation factors such as aged deterioration and temperature change of strain resistance element 22 are cut by a filter circuit (not shown) for cutting a DC component of a voltage. Consequently, reliability of an output is improved. With the constitution described above, an absolute value of tension is not detected and only an amount of change in tension is outputted.

An example of an output waveform of tension sensor 14 is shown in FIG. 5. In FIG. 5, an abscissa indicates time and an ordinate indicates an output. A solid line indicates a waveform at the time when an automobile collides with a pedestrian and a broken line indicates a waveform at the time when the automobile collides with a fixed object. When the automobile collides with a pedestrian, bumper 30 and substrate 11 are deformed suddenly, wire 13 is pulled, and tension increases rapidly. Thereafter, the pedestrian is sent flying and the deformation of substrate 11 does not progress any more. Therefore, wire 13 undergoes a change while keeping stress corresponding to an amount of deformation of substrate 11 in a state in which the pedestrian is sent flying. Thus, a change in tension increases rapidly at an instance of the collision and, after that, fixed tension is kept.

When the change is considered in terms of an output with a DC component cut from the viewpoint of detection circuit 23, the change represents the amount of change in tension, that is, a differential amount. An amount of change in output also increases rapidly according to the rapid increase in tension generated at an instance of the collision with the pedestrian. Since tension becomes constant as the pedestrian is sent flying, the amount of change decreases rapidly to reach 0 finally. Therefore, a waveform of the output has a peak as indicated by the solid line in FIG. 5.

When the automobile collides with a fixed object, as in the case of the collision with the pedestrian, first, substrate 11 is deformed suddenly and wire 13 is pulled, and tension increases rapidly. Thereafter, since the fixed object is not sent flying, substrate 11 continues to be deformed until the automobile stops or is bounced back by the fixed object. Therefore, wire 13 continues to extend over a long time by tension larger than the tension in the state in which the pedestrian is sent flying. Finally, wire 13 undergoes a change while keeping tension according to an amount of deformation of substrate 11. Thus, a change in tension increases rapidly to a value larger than that in the case of collision with the pedestrian at an instance of the collision and, after that, continues to increases more slowly than at the time of the collision. Finally, fixed tension is kept.

When the change is considered in terms of an output with a DC component cut from the viewpoint of detection circuit 23, an amount of change in output also increases rapidly according to the rapid increase in tension caused at an instance of the collision with the fixed object. When bumper 30 and substrate 11 continue to be deformed, an amount of change in tension decreases gently. When the automobile stops or is bounced back, the deformation of substrate 11 stops and tension becomes constant. Thus, the mount of change finally reaches 0. Therefore, a waveform of an output has a peak and gently decreases as indicated by a dotted line in FIG. 5.

It is possible to distinguish collision with a human and collision with an object from each other using such a difference in output characteristics. An algorithm for that purpose is shown in a flowchart in FIG. 6. Note that the software is executed by a microcomputer (not shown) built in detection circuit 23. First, the microcomputer reads an output with a DC component cut of tension sensor 14 (S1). The microcomputer compares the output with an output value of the last time (S2). If there is no change in the output value, since collision has not occurred (No in S2), the microcomputer updates the value read this time as the last value (S3). Thereafter, the microcomputer returns to S1.

When the output value changes in S2 (Yes in S2), since some collision has occurred in bumper 30 integrated with substrate 11, the microcomputer continuously reads a change in tension sensor 17 after that for a defined time (S4). The defined time is determined by calculating time equivalent to T shown in FIG. 5 in advance from an output characteristic of tension sensor 14 at the time when a pedestrian dummy is caused to collide with an automobile having a bumper collision sensor built therein. After reading an output for the defined time, the microcomputer searches for a maximum value and judges whether the value is within a defined range (a maximum value range of an output waveform calculated by causing the pedestrian dummy to collide with bumper 30 as described above) (S5).

When the maximum value is within the defined range (Yes in S5), the microcomputer compares an absolute value of output attenuation speed after the maximum value and a defined value (an attenuation speed absolute value of an output waveform calculated from the pedestrian dummy) (S6). When the absolute value is larger than the defined value (Yes in S6), the microcomputer judges that bumper 30 has collided with a pedestrian and outputs a magnitude of the maximum value as a magnitude of deformation of bumper 30 with a digital signal (S7). The microcomputer informs a system side that bumper 30 has collided with the pedestrian by outputting the value. On the other hand, when it is judged in S5 that the maximum value is outside the defined range (No in S5) or it is judged in S6 that the absolute value is smaller than the defined value (No in S6), the microcomputer judges that bumper 30 has collided with a fixed object and outputs a fixed object collision flag for, for example, decrementing a value of the magnitude of deformation by one (S8).

As described above, the bumper collision sensor performs judgment of collision in the detection circuit 23. Consequently, it is possible to eliminate an influence of disturbance noise on wiring between tension sensor 14 and the pedestrian protection system as in the case in which an output of tension sensor 14 is directly sent to the pedestrian protection system as an analog value. As a result, high reliability is obtained and burden on the software of the pedestrian protection system is reduced.

When bumper 30 collides with a pedestrian, since a magnitude of deformation of bumper 30 is outputted digitally, the bumper collision sensor is not affected by noise as described above and reliability is improved. Moreover, it is possible to directly judge on the pedestrian protection system side whether bumper 30 has collided with an adult or a child from a matrix of a magnitude of deformation and vehicle speed at the time of collision calculated from a collision test using a pedestrian dummy in advance. Thus, it is possible to easily perform optimum expansion control for an airbag corresponding to the judgment.

With the constitution and the operations described above, it is possible to obtain a bumper collision sensor that can detect collision with high reliability without hurting a pedestrian even if bumper 30 and substrate 11 are deformed significantly.

Note that, although substrate 11 is integrally fixed to bumper 30 with an adhesive or the like in the explanation of this embodiment, a substrate may be a bumper.

Second Embodiment

Figure 7:
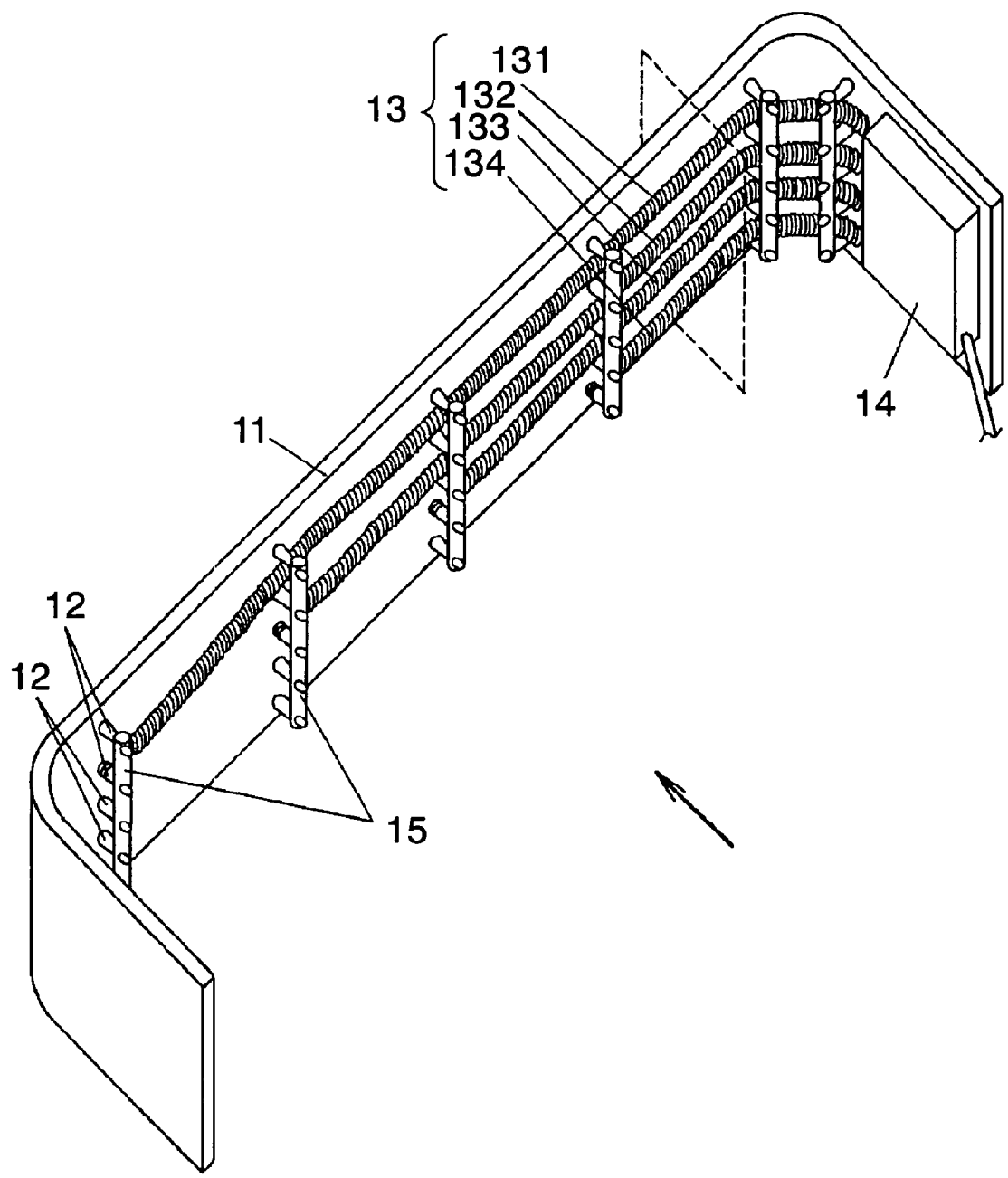
FIG. 7 is a schematic perspective view of a bumper collision sensor in a second embodiment of the invention.
Figure 8A:
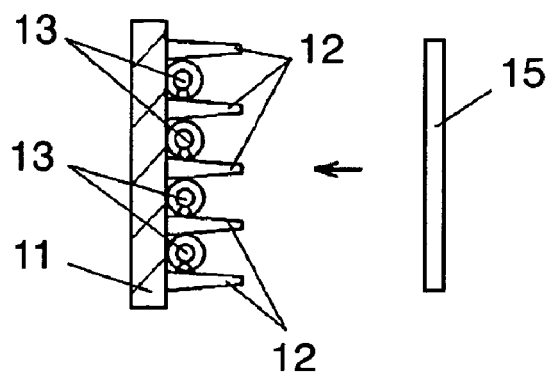
FIG. 8A is a diagram of a state in which a wire is fit in between projections of the bumper collision sensor in the second embodiment.
Figure 8B:
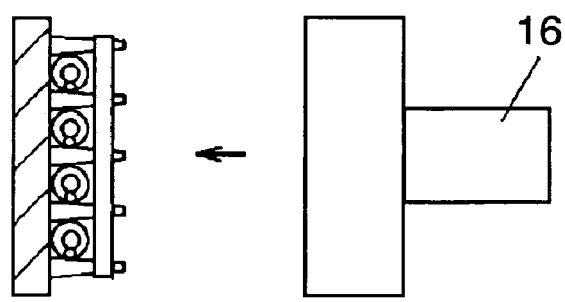
FIG. 8B is a diagram of a state in which a wire holding member is fit inbetween the projections of the bumper collision sensor in the second embodiment.
Figure 8C:
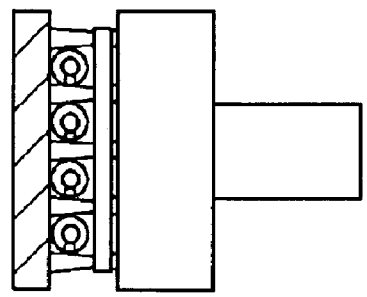
FIG. 8C is a diagram of a state in which heat press is applied to the projections of the bumper collision sensor in the second embodiment.
Figure 8D:
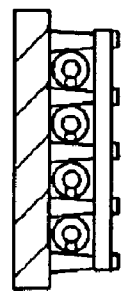
FIG. 8D is a diagram of a state in which integration of the wire holding member in the projections of the bumper collision sensor in the second embodiment is completed.
Figure 9:
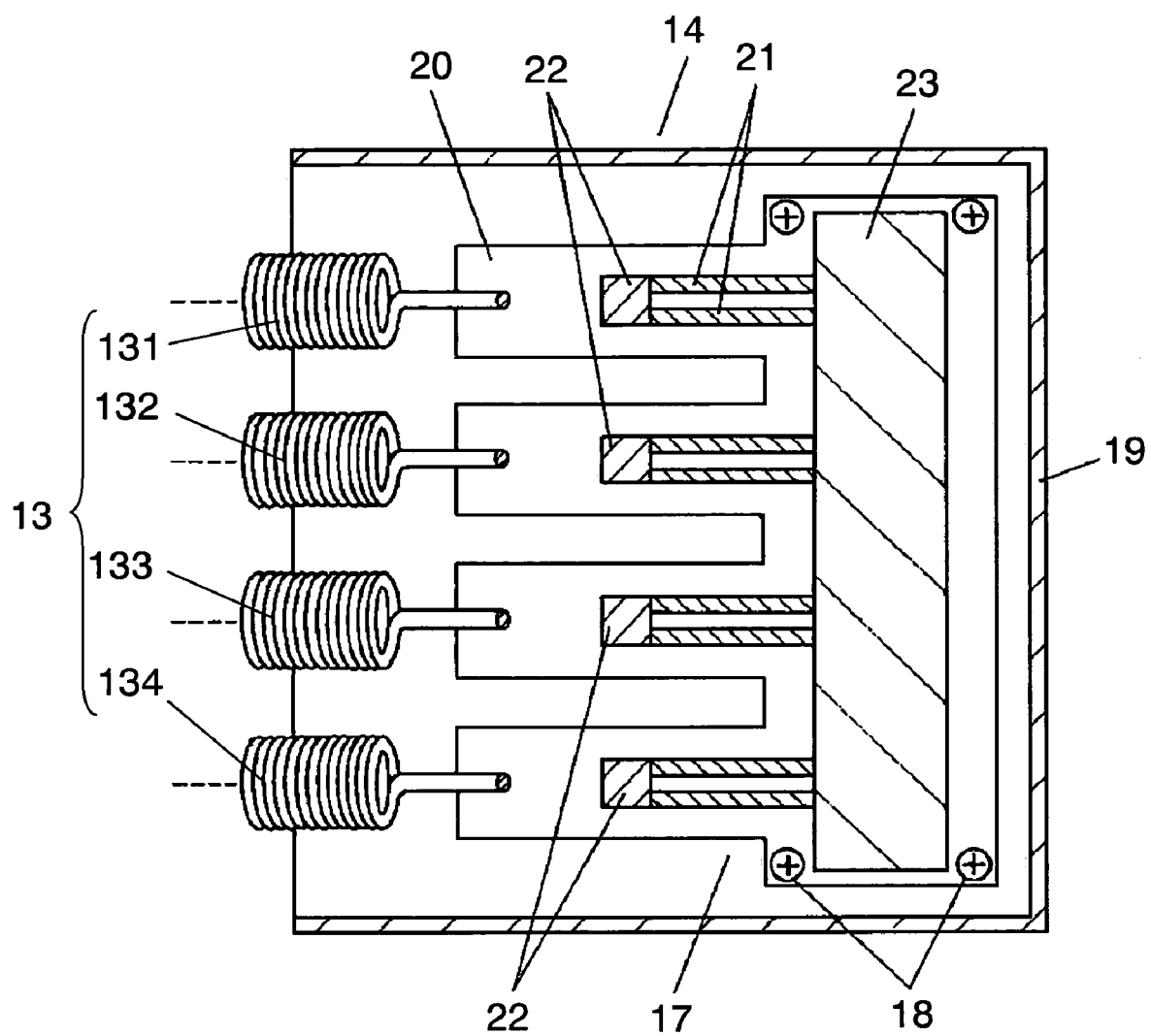
FIG. 9 is a partial sectional view showing a structure of a tension sensor in the bumper collision sensor in the second embodiment.
Figure 10A:
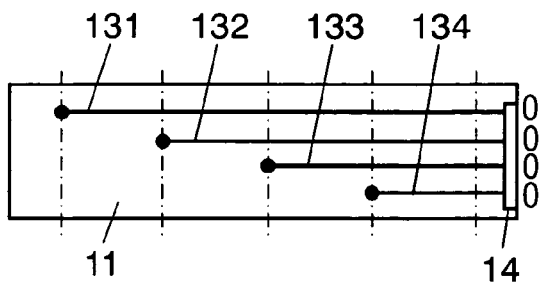
FIG. 10A is a diagram of a wire in a normal (non-collision) state in a schematic diagram showing a wire deformation pattern according to a collision position in the bumper collision sensor in the second embodiment.
Figure 10B:
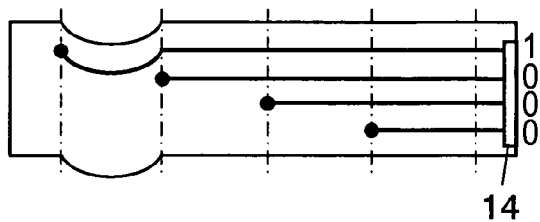
FIG. 10B is a diagram of a wire state upon a left collision in the schematic diagram of the bumper collision sensor in the second embodiment.
Figure 10C:
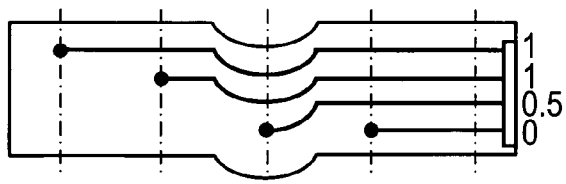
FIG. 10C is a diagram of a wire state upon a center collision in the schematic diagram of the bumper collision sensor in the second embodiment.
Figure 10D:
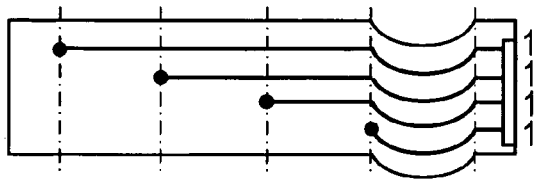
FIG. 10D is a diagram of a wire state upon a right collision in the schematic diagram of the bumper collision sensor in the second embodiment.
Figure 10E:
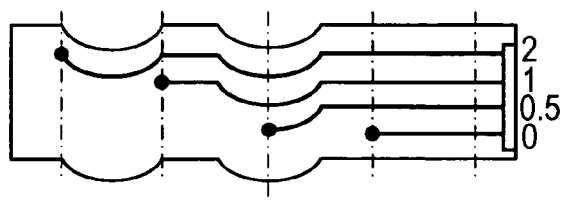
FIG. 10E is a diagram of a wire state upon left and center collisions in the schematic diagram of the bumper collision sensor in the second embodiment.
Figure 10F:
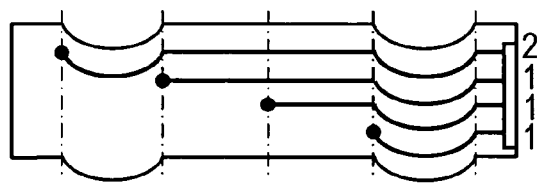
FIG. 10F is a diagram of a wire state upon left and right collisions in the schematic diagram of the bumper collision sensor in the second embodiment.
Figure 10G:
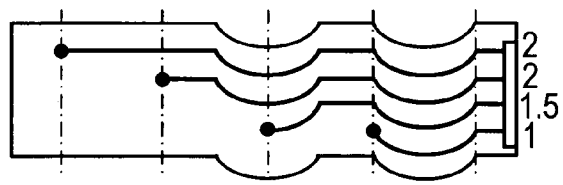
FIG. 10G is a diagram of a wire state upon center and right collisions in the schematic diagram of the bumper collision sensor in the second embodiment.
Figure 10H:
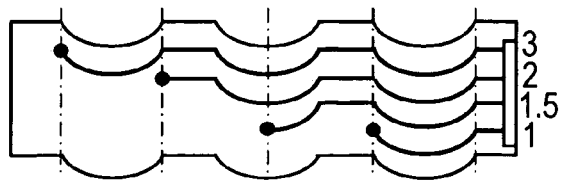
FIG. 10H is a diagram of a wire state upon left, center, and right collisions in the schematic diagram of the bumper collision sensor in the second embodiment.

FIG. 7 is a schematic perspective view of a bumper collision sensor in a second embodiment of the invention. FIG. 8A is a diagram of a state in which wires are fit in between projections of the bumper collision sensor in this embodiment. FIG. 8B is a diagram of a state in which a wire holding member is fit in between the projections of the bumper collision sensor in this embodiment. FIG. 8C is a diagram of a state in which a heat press is applied to the projections of the bumper collision sensor in this embodiment. FIG. 8D is a diagram of a state in which integration of the wire holding member in the projections of the bumper collision sensor in this embodiment is completed. FIG. 9 is a partial sectional view showing a structure of a tension sensor in the bumper collision sensor in this embodiment. FIG. 10A is a diagram of a wire state at normal time in a schematic diagram showing a wire deformation pattern according to a collision position in the bumper collision sensor in this embodiment. FIG. 10B is a diagram of a wire state upon a left side collision in the schematic diagram of the bumper collision sensor in this embodiment. FIG. 10C is a diagram of a wire state at center collision time in the schematic diagram of the bumper collision sensor in this embodiment. FIG. 10D is a diagram of a wire state at upon a right-side collision in the schematic diagram of the bumper collision sensor in this embodiment. FIG. 10E is a diagram of a wire state upon left and center collisions in the schematic diagram of the bumper collision sensor in this embodiment. FIG. 10F is a diagram of a wire state upon left and right collisions in the schematic diagram of the bumper collision sensor in this embodiment. FIG. 10G is a diagram of a wire state upon center and right collisions in the schematic diagram of the bumper collision sensor in this embodiment. FIG. 10H is a diagram of a wire state upon left, center, and right collisions in the schematic diagram of the bumper collision sensor in this embodiment.

Figure 11:
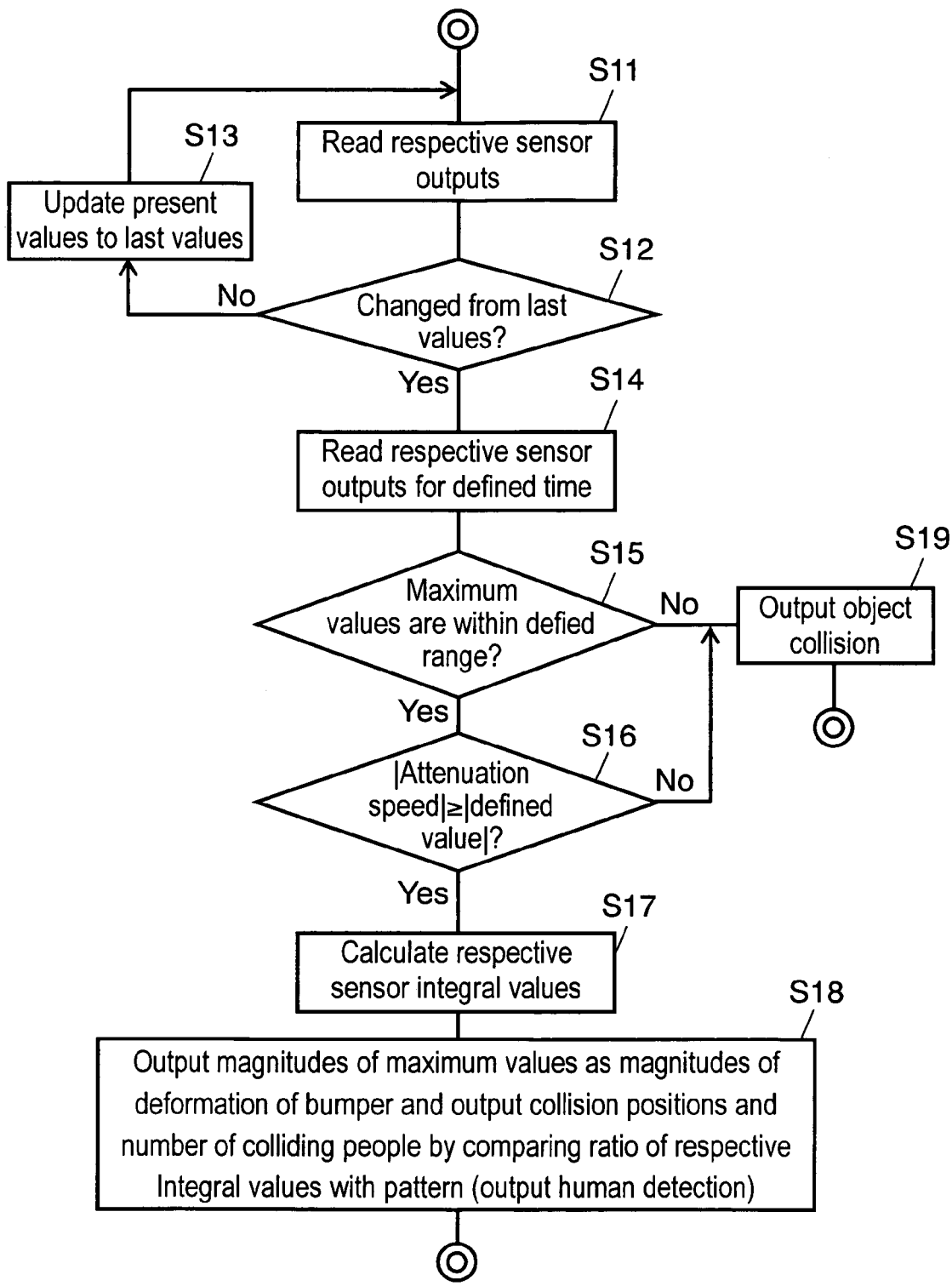
FIG. 11 is a flowchart describing operations of the bumper collision sensor in the second embodiment.

FIG. 11 is a flowchart showing operations of the bumper collision sensor in this embodiment. In FIG. 7, FIGS. 8A to 8D, and FIG. 9, components that are the same as those in FIG. 1, FIGS. 2A to 2D, and FIG. 3, respectively, are denoted by the same reference numerals. Explanations of such components are omitted.

A characteristic of the bumper collision sensor in this embodiment shown in FIG. 7 is different from the constitution of the first embodiment shown in FIG. 1 in that plural (four in FIG. 7) wires 13 with lengths different from one another are arranged in parallel to a longitudinal direction of substrate 11. The number of projections 12 is increased and wire holding members 15 are extended in association with the increase in the number of wires 13 such that all wires 13 can beheld. Tension detecting units (not shown), equal in number to the wires 13, are built in tension sensor 14. Substrate 11 also serves as a bumper.

With such a constitution, for example, in FIG. 7, when a pedestrian collides with the right side of substrate 11 also serving as a bumper, since all four wires 13 are pulled, all four outputs of the tension detecting units change. On the other hand, when a pedestrian collides with the left side of the substrate 11, since only the longest wire 13 (a wire at the top in FIG. 7) is pulled, only an output of the tension detecting unit to which the top wire 13 is connected changes. Therefore, by adopting the constitution shown in FIG. 7, a new function is added in that it is possible to judge which position of the bumper a pedestrian collides with.

As shown in FIGS. 8A to 8D, a method of integrating wires 13 in substrate 11 of such a bumper collision sensor has substantially the same procedures as those shown in FIG. 2. FIGS. 8A to 8D show a section of a dotted line part in FIG. 7. In the example in FIGS. 8A to 8D, in order to hold four wires 13, five projections 12 are provided for each of wire holding members 15, wire holding members 15 are extended in association with the increase in the number of projections 12, and the number of not-shown holes is also increased to five. It is possible to integrate the four wires 13 with substrate 11 at the same time in the same process as in the first embodiment by fixing these with heat press 16 simultaneously as in the first embodiment.

An internal structure of tension sensor 14 is shown in FIG. 9. Basically, the number of tension sensors 14 may be increased to four in association with the increase in the number of wires 13 to four. As shown in FIG. 9, it is possible to form four tension detecting units 17 on the same row from one stainless steel substrate 20 by providing four beams constituting tension detecting units 17 on stainless steel substrate 20. With such a constitution, space efficiency of tension sensor 14 is improved. Production efficiency is improved by forming strain resistance elements 22 at the same time through printing and sintering processes. In addition, it is possible to provide the four tension detecting units 17 with less fluctuation.

Moreover, it is possible to form a common detection circuit 23 in root portions of the four beams. It is possible to share the judgment by the microcomputer. Thus, compared with the case in which the four tension sensors are provided separately, the provision of detection circuit 23 is simplified. It is possible to improve reliability and reduce cost through reduction in the number of components.

Operations in this embodiment will be explained. Note that a vehicle speed range as a premise of the operations is set to 20 to 60 km per hour as in the first embodiment. Outputs of respective tension detecting units 17 at the time when a pedestrian or a fixed object collides with substrate 11 also serving as the bumper are the same as those shown in FIG. 5. An operation for detecting a collision position, which is a characteristic of the second embodiment, will be explained.

FIGS. 10A to 10H are schematic diagrams of substrate 11 viewed from the direction shown by an arrow in FIG. 7. In FIGS. 10A to 10H, four wires 13 are indicted by bold lines. In order to distinguish respective wires 13, wires 13 are defined as wire 131, wire 132, wire 133, and wire 134 in order from the longest one provided at the top part of substrate 11. Tension detecting units 17 connected to respective wires 13 cut an output of a DC component with a filter (not shown) provided in detection circuit 23 in order to avoid influences of aged deterioration and temperature change as in the first embodiment.

In a normal (non-collision) state shown in FIG. 1A, since substrate 11 is not deformed, tension is not applied to respective wires 13. Therefore, all outputs of respective tension detecting units 17 are zero. When a pedestrian collides with the left of substrate 11, the left side of substrate 11 is deformed as shown in FIG. 10B. The deformation is represented as a downward dent. Deformation is represented in the same manner in the other figures. In this case, only wire 131 is pulled because of the deformation. When an integral value (an area) of a waveform indicated by a solid line in FIG. 5 at that point is assumed to be 1, a ratio of outputs that are integral values of waveforms of respective tension detecting units 17 is 1:0:0:0. The ratio is shown on the right side of tension sensor 14 in FIG. 10B. Ratios are shown in the same manner in the other figures.

When a pedestrian collides with the center of substrate 11, the center of the substrate 11 is deformed as shown in FIG. 10C. In this case, wires 131, 132, and 133 are pulled. When a degree of the pull is represented as a ratio of output integral values of respective tension detecting units 17, the ratio is 1:1:0.5:0. Similarly, when a pedestrian collides with the right of substrate 11, the right side of the substrate 11 is deformed as shown in FIG. 10D and all wires 13 are pulled. A ratio of output integral values of respective tension detecting units 17 is 1:1:1:1. From the above, it is possible to learn with which part of substrate 11 the pedestrian collides according to a ratio of output integral values of respective tension detecting units 17.

Note that, although there are four different length wires 13 in this embodiment, a larger number of wires with more finely varied lengths may be provided. Consequently, it is possible to further improve position detection accuracy.

In the constitution in FIG. 7, it is also possible to learn positions when plural pedestrians collide with substrate 11 simultaneously. FIG. 10E shows a case in which pedestrians collide with the left and the center of substrate 11 simultaneously. In this case, since the left side and the center of the substrate 11 are deformed, wires 13 arranged in the portions are pulled. Since wire 131 is pulled in two places, an output integral value of tension detecting units 17 is about twice as large as that in one place. On the other hand, the other wires 132, 133, and 134 are pulled in the same manner as the case in which a pedestrian collides with only the center of substrate 11, a ratio of output integral values of respective tension detecting units 17 is 2:1:0.5:0.

Similarly, when pedestrians collide with the left and the right of substrate 11 simultaneously, as shown in FIG. 10F, a ratio of output integral values of respective tension detecting units 17 is 2:1:1:1. When pedestrians collide with the center and the right side of substrate 11 simultaneously, as shown in FIG. 10G, a ratio of output integral values of respective tension detecting units 17 is 2:2:1.5:1. When three pedestrians collide with substrate 11 simultaneously, since the left and the right and the center of substrate 11 are deformed as shown in FIG. 10H, a ratio of output integral values of respective tension detecting units 17 is 3:2:1.5:1. The eight types of collision patterns including that in a normal (non-collision) state are described. It is seen that the ratios of output integral values are different from one another. Therefore, it is possible to learn how many pedestrians collide with which parts of substrate 11 by calculating a ratio of output integral values.

Note that a reason for using output integral values is as described below. When a maximum value of outputs described in the first embodiment is used, a maximum value corresponding to the number of colliding people is obtained if plural pedestrians collide with substrate 11 completely simultaneously. However, if there are slight time differences among collisions of the pedestrians, since plural peak values appear, a maximum value proportional to the number of colliding people is not always obtained. On the other hand, when an integral value of a waveform is used, a maximum value is low even if there are time differences. Thus, it is possible to calculate the number of colliding people more accurately compared with the detection of a maximum value because a width of a waveform is increased.

Therefore, when one pedestrian collides with substrate 11, it is possible to use a maximum value as a magnitude of deformation of substrate 11 as in the first embodiment even if outputs are not integrated. It is also possible to learn a collision position according to the tension detecting unit 17 for which the maximum value is obtained. When a judgment output assuming collision with plural pedestrians is obtained, it is advisable to use a ratio of output integral values. On the basis of the operations described above, an algorithm of operations in the second embodiment is shown in a flowchart in FIG. 11. Note that the software is also executed by the microcomputer (not shown) built in detection circuit 23 as in the first embodiment.

First, the microcomputer reads outputs with DC components cut of respective tension detecting units 17 (S11). The microcomputer compares the outputs with output values of the last time (S12). If there is no change in the output values, since collision has not occurred (No in S12), the microcomputer updates the values read this time as the last values, respectively (S13). Thereafter, the microcomputer returns to S11. When any one of the output values changes in S12 (Yes in S12), since some collision has occurred in substrate 11, the microcomputer continuously reads changes in respective tension detecting units 17 after that for a defined time (S14) A method of determining the defined time is the same as that in the first embodiment.

After reading outputs for the defined time, the microcomputer searches for maximum values of the respective outputs and judges whether the values are within a defined range that is a maximum value range of an output waveform calculated by causing the pedestrian dummy to collide with substrate 11 (S15). When the maximum values are within the defined range (Yes in S15), the microcomputer compares absolute values of output attenuation speed after the maximum values and a defined value that is an attenuation speed absolute value of an output waveform calculated from the pedestrian dummy (S16). When the absolute values are larger than the defined value (Yes in S16), the microcomputer judges that substrate 11 has collided with pedestrians, calculates maximum values of respective tension detecting units 17, and integrates output values (S17).

The microcomputer outputs magnitudes of the maximum values as magnitudes of deformation of substrates 11 also serving as the bumper with a digital signal and outputs collision positions and the number of colliding people by comparing a ratio of the respective integral values with the pattern shown in FIG. 10 (S18). Note that, since the magnitudes of deformation of substrate 11 are outputted digitally, a system side is informed that substrate 11 has collided with the pedestrian. On the other hand, when it is judged in S15 that the maximum values are outside the defined range (No in S15) or it is judged in S16 that the absolute values are smaller than the defined value (No in S16), the microcomputer judges that substrate 11 has collided with a fixed object and outputs a fixed object collision flag for, for example, decrementing values of the magnitudes of deformation by one (S19).

As described above, the bumper collision sensor performs judgment of collision in the detection circuit 23. Consequently, it is possible to eliminate an influence of disturbance noise on wiring and therefore reliability is improved as in the first embodiment. Moreover, the bumper collision sensor outputs collision positions and the number of colliding people. Consequently, in a pedestrian protection system having plural airbags, the burden on the software for controlling optimum expansion of the airbags close to the collision positions is reduced. It is possible to perform optimum expansion control for the airbags as the pedestrian protection system as a whole including judgment on an adult or a child by the digital output of magnitudes of deformation of substrate 11 also serving as the bumper.

With the constitution and the operations described above, it is possible to obtain a bumper collision sensor that can detect how many people collide with which parts of substrate 11 with high reliability without hurting pedestrians even if substrate 11 also serving as the bumper is deformed significantly.

Third Embodiment

Figure 12:
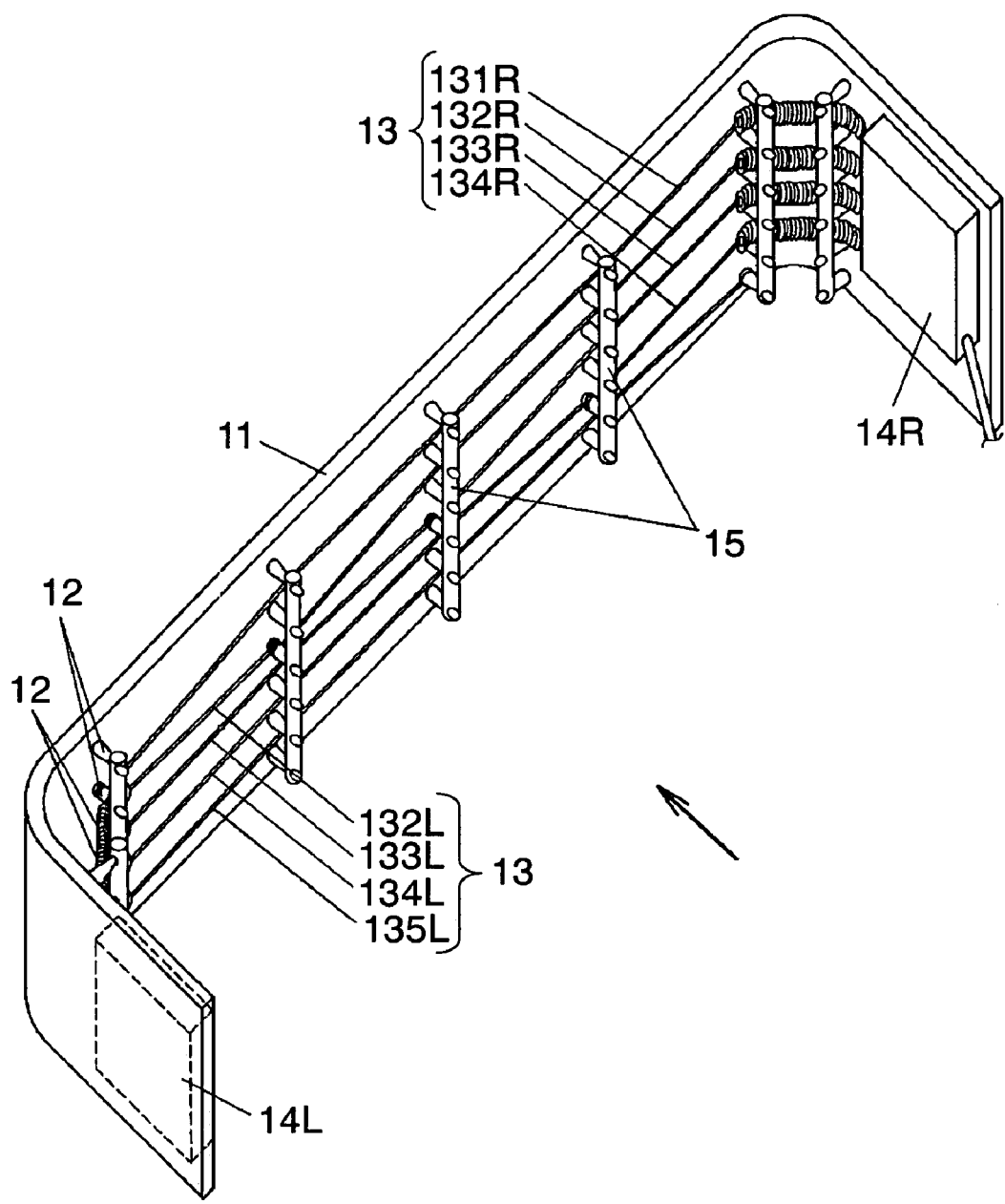
FIG. 12 is a schematic perspective view of a bumper collision sensor in a third embodiment of the invention.
Figure 13A:
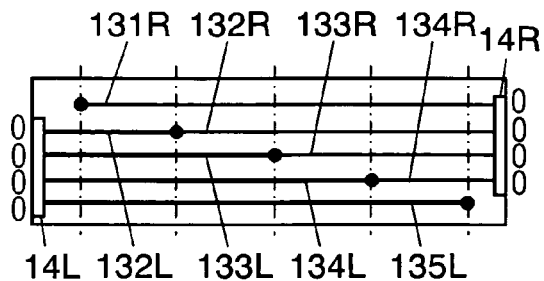
FIG. 13A is a diagram of a normal wire state in a schematic diagram showing a wire deformation pattern according to a collision position in the bumper collision sensor in the third embodiment.
Figure 13B:
FIG. 13B is a diagram of a wire state upon a left collision in the schematic diagram of the bumper collision sensor in the third embodiment.
Figure 13C:
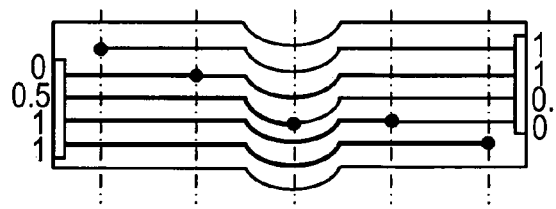
FIG. 13C is a diagram of a wire state upon a center collision in the schematic diagram of the bumper collision sensor in the third embodiment.
Figure 13D:
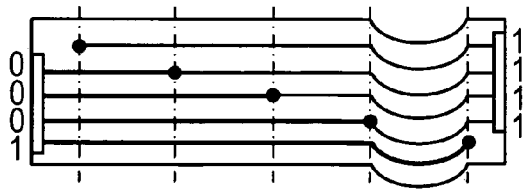
FIG. 13D is a diagram of a wire state upon a right collision in the schematic diagram of the bumper collision sensor in the third embodiment.
Figure 13E:
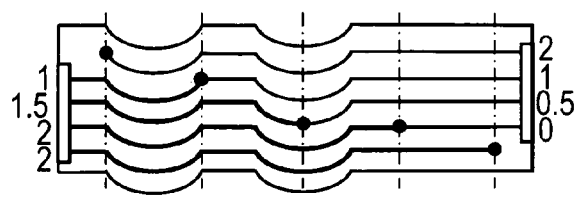
FIG. 13E is a diagram of a wire state upon left and center collisions in the schematic diagram of the bumper collision sensor in the third embodiment.
Figure 13F:
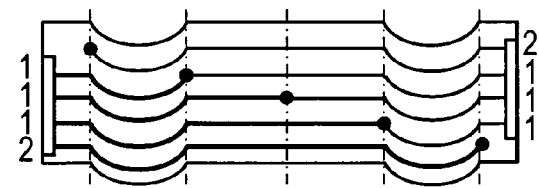
FIG. 13F is a diagram of a wire state upon left and right collisions in the schematic diagram of the bumper collision sensor in the third embodiment.
Figure 13G:
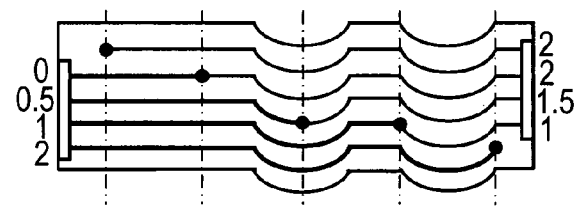
FIG. 13G is a diagram of a wire state upon center and right collisions in the schematic diagram of the bumper collision sensor in the third embodiment.
Figure 13H:
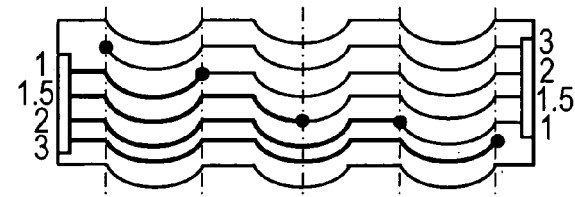
FIG. 13H is a diagram of a wire state upon left, center, and right collisions in the schematic diagram of the bumper collision sensor in the third embodiment.
Figure 14:
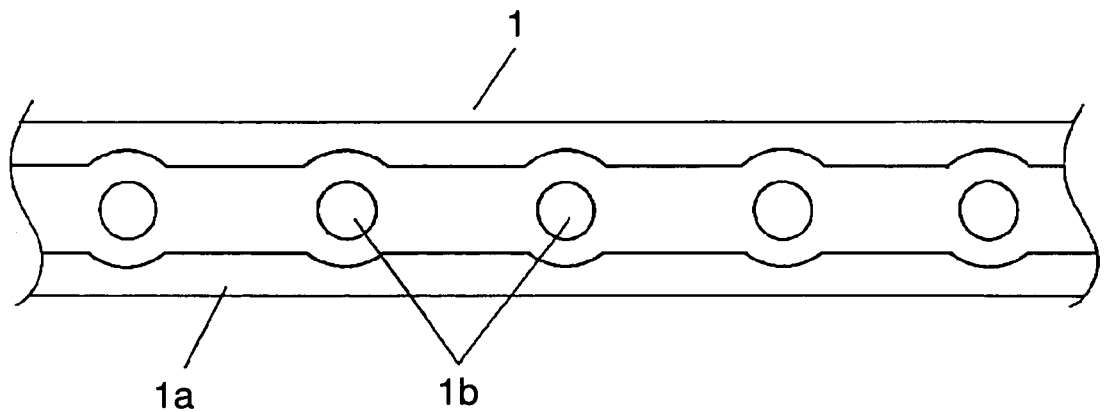
FIG. 14 is a plan view of a load sensor that is a conventional bumper collision sensor.
Figure 15:
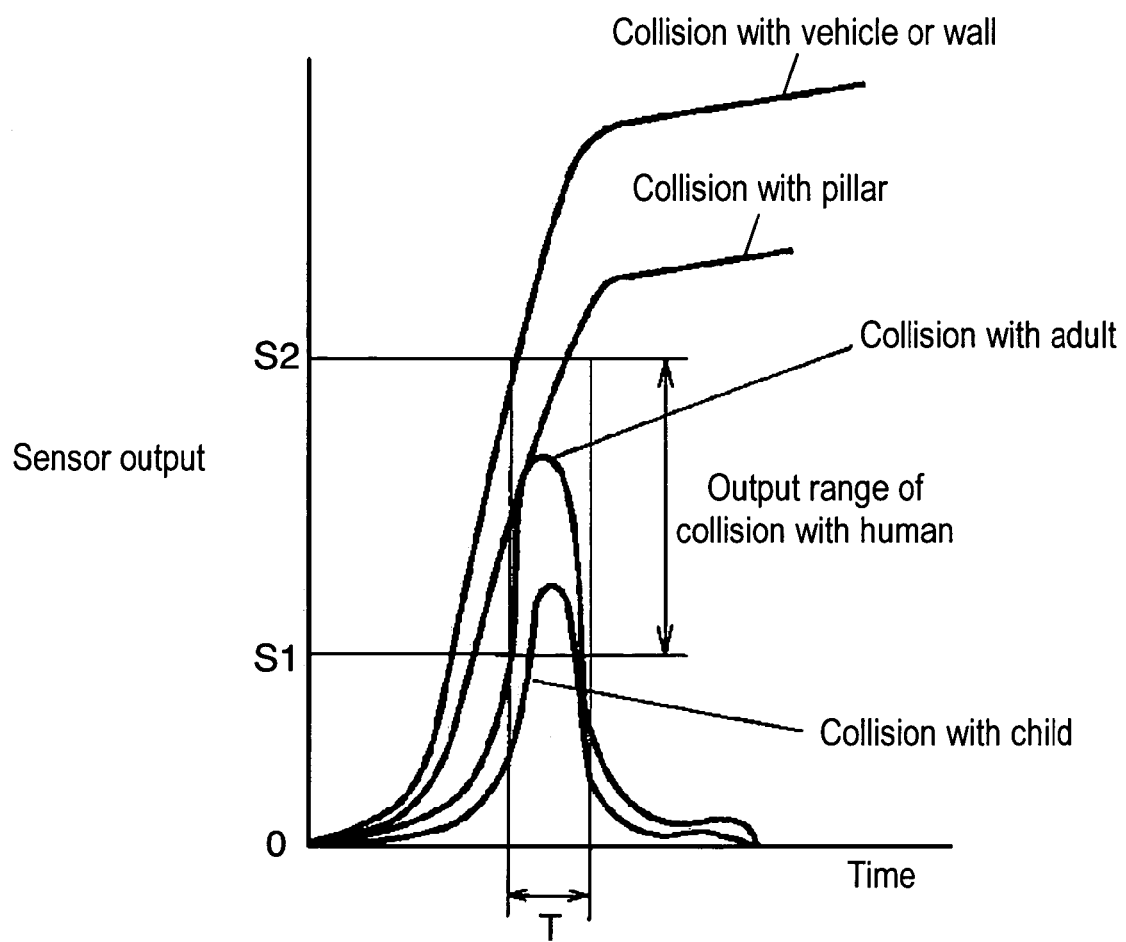
FIG. 15 is an output waveform chart of the load sensor that is the conventional bumper collision sensor.

FIG. 12 is a schematic perspective view of a bumper collision sensor in a third embodiment of the invention. FIG. 13A is a diagram of a wire in a normal (non-collision) state in a schematic diagram showing a wire deformation pattern according to a collision position in the bumper collision sensor in this embodiment. FIG. 13B is a diagram of a wire state upon a left collision in the schematic diagram of the bumper collision sensor in this embodiment. FIG. 13C is a diagram of a wire state upon a center collision in the schematic diagram of the bumper collision sensor in this embodiment. FIG. 13D is a diagram of a wire state upon a right collision in the schematic diagram of the bumper collision sensor in this embodiment. FIG. 13E is a diagram of a wire state upon left and center collisions in the schematic diagram of the bumper collision sensor in this embodiment. FIG. 13F is a diagram of a wire state upon left and right collisions in the schematic diagram of the bumper collision sensor in this embodiment. FIG. 13G is a diagram of a wire state upon center and right collisions in the schematic diagram of the bumper collision sensor in this embodiment. FIG. 13H is a diagram of a wire state upon left, center, and right collisions in the schematic diagram of the bumper collision sensor in this embodiment.

In FIG. 12 and FIGS. 13A to 13H, components that are the same as those in FIG. 1 and FIGS. 10A to 10H, respectively, are denoted by the same reference numerals. Explanations of such components are omitted. A characteristic of the bumper collision sensor in the third embodiment shown in FIG. 12 is that the bumper collision sensor includes a pair of bumper collision sensors with the same constitution as in the second embodiment shown in FIG. 7, tension sensor 14R of one of the bumper collision sensors is mounted on a position of a bumper shown on an upper right side in FIG. 12, and tension sensor 14L of the other of the bumper collision sensors is mounted on a position of the bumper shown on a lower left side in FIG. 12.

In order to mount respective bumper collision detecting units built in the pair of tension sensors 14R and 14L with high space efficiency, as shown in FIG. 12, wires 13 are arranged such that a relation between wires is reversed, for example, in a place where one wire 13 is long, the other wire 13 is arranged short. Consequently, it is possible to mount the pair of bumper collision sensors on a substrate also serving as a bumper by simply adding one or more stages of projections 12 in addition to those in FIG. 7. Note that, although a structure in which only a part of wires 13 are tension springs is shown in FIG. 12, all wires 13 may be tension springs as described in the first and the second embodiments. Also wires 13 in the first and the second embodiments may be only part tension springs. Although the substrate is the bumper in the explanations of the second and the third embodiments, the substrate may be attached to the bumper as in the first embodiment. A method of attaching the substrate is not limited to a method using an adhesive. It is also possible that a groove is provided and the substrate is fit in the groove. Alternatively, the substrate is attached by high-frequency welding or may be fixed by plastic rivets. Moreover, a material of the substrate and a plastic property thereof may be identical with or different from those of the bumper.

By adopting the constitution in this embodiment, since two tension sensors 14 are provided, even if one tension sensor 14 or tension detecting unit 17 built in tension sensor 14 breaks down, an output is obtained by the other tension sensor 14 as explained with reference to FIGS. 10A to 10H. Thus, reliability of the entire pedestrian safety system is extremely improved. This point will be explained in detail with reference to FIGS. 13A to 13H. FIGS. 13A to 13H are, like FIGS. 10A to 10H, schematic diagrams showing wire deformation patterns according to collision positions of the bumper collision sensor viewed in the direction of the arrow shown in FIG. 12. Two sets of wires 13 are shown with different line thicknesses such that wires 13 can be distinguished from one another in the figures.

In order to distinguish all wires 13, wires 13 connected to tension sensor 14R fixed to the right side of the bumper are defined as wire 131R, wire 132R, wire 133R, and wire 134R in order from the longest one provided at the top part of substrate 11.

Wires 13 connected to tension sensor 14L fixed to the left side of the bumper are defined as wire 132L, wire 133L, wire 134L, and wire 135L in order from the shortest one provided at the top part of substrate 11. For consistency of numbering, wires in the same position in a row direction are given the same number and distinguished by characters L and R. Note that there is no wire on the L side corresponding to longest wire 131R and a wire on the R side corresponding to longest wire 135L.

As in FIG. 10, numbers shown on the left and the right of substrate 11 represent a ratio of output integral values of respective tension detecting units 17 built in tension sensors 14. In a normal (non-collision) state shown in FIG. 13A, since substrate 11 is not deformed, tension is not applied to respective wires 13. Therefore, all outputs of respective tension detecting units 17 are zero.

When a pedestrian collides with the left of substrate 11 also serving as the bumper, the left side of substrate 11 is deformed as shown in FIG. 13B. In this case, only wire 131R among wires 13 connected to tension sensor 14R on the right side is pulled by deformation. On the other hand, all wires 13 (132L, 133L, 134L, and 135L) connected to tension sensor 14L on the left side are pulled. Therefore, a ratio of output integral values of respective tension detecting units 17 on the right side is 1:0:0:0 and a ratio of output integral values of respective tension detecting units 17 on the left side is 1:1:1:1.

Similarly, when a pedestrian collides with the center of substrate 11, as shown in FIG. 13C, a ratio on the right side is 1:1:0.5:0 and a ratio on the left side is 0:0.5:1:1. When a pedestrian collides with the right of substrate 11, as shown in FIG. 13D, a ratio on the right side is 1:1:1:1 and a ratio on the left side is 0:0:0:1.

Similarly, when plural pedestrians collide with the left and the center of substrate 11, as shown in FIG. 13E, a ratio on the right side is 2:1:0.5:0 and a ratio on the left side is 1:1.5:2:2. When plural pedestrians collide with the left and the right of substrate 11, as shown in FIG. 13F, a ratio on the right side is 2:1:1:1 and a ratio on the left side is 1:1:1:2. When plural pedestrians collide with the right and the center of substrate 11, as shown in FIG. 13G, a ratio on the right side is 2:2:1.5:1 and a ratio on the left side is 0:0.5:1:2. When plural pedestrians collide with the left and the right and the center of substrate 11, as shown in FIG. 13H, a ratio on the right side is 3:2:1.5:1 and a ratio on the left side is 1:1.5:2:3.

In this way, two sets of ratios of output integral values are obtained according to respective states of collision. Therefore, in the second embodiment, when one of tension detecting units 17 breaks down and deviates from the eight patterns of ratios of output integral values shown in FIGS. 10A to 10H, it is impossible to learn in which state a pedestrian actually collided with substrate 11. However, in the third embodiment, another set of ratios of output integral values are obtained. Thus, if any one of the patterns matches a state of collision, extremely high reliability against failure is obtained by outputting the state of collision. Note that an algorithm of operations is the same as that shown in FIG. 11.

Moreover, by adopting the constitution, there is an effect that, for example, even when substrate 11 collides with a pedestrian near a corner of a building, the possibility of pedestrian detection is improved. This point will be explained in detail below. For example, a case in which a corner of a building collides in offset with the right side of substrate 11 also serving as the bumper and the left side of substrate 11 hits a pedestrian near the corner of the building is considered. In the structures in the first and the second embodiments, since tension sensor 14 is fixed to the right end of substrate 11, when substrate 11 collides with a corner of a building, tension sensor 14 itself is destroyed. It could be difficult to detect a pedestrian colliding with the substrate 11 simultaneously.

On the other hand, in the third embodiment, even if tension sensor 14R on the right side is destroyed, tension sensor 14L on the left side continues to operate. In this case, a waveform of an output of tension detecting unit 17 connected to long wires 133L, 134L, and 135L changes to a waveform as indicated by the dotted line in FIG. 5 because of the collision with the building. Thus, it is judged that substrate 11 collides with a fixed object. However, since a waveform of only shortest wire 132L changes to a waveform as indicated by the solid line in FIG. 5, it is possible to learn that substrate 11 collides with a human. In this case, in a system having plural hood airbags, an airbag in a portion colliding with the building is destroyed or, even if the airbag is not destroyed, it is unnecessary to expand the airbag because there is no pedestrian. It is also unnecessary to judge collision positions and the number of collisions. Only an airbag on the left side of substrate 11 colliding with the human has to be expanded. According to such an operation, even if one tension sensor 14 is destroyed by collision, the possibility that collision of a pedestrian can be detected by the other tension sensor 14 is improved.

With the constitution and the operations described above, it is possible to obtain a bumper collision sensor that can detect how many people collide with which parts of substrate 11 with high reliability without hurting pedestrians even if substrate 11 also serving as the bumper is deformed significantly.

Note that a movable body on which the bumper collision sensor of the invention is mounted is not limited to an automobile. An object with which the movable body collides is not limited to a human in a walking state and may be a human riding an object having strength of the same degree as a human or may be other animals.

According to the constitution described above, it is possible to detect extension of the extendable portion corresponding to deformation of the bumper and the substrate due to collision as tension of the wire with the tension sensor. It is possible to detect collision without hurting a pedestrian even if the bumper is deformed significantly.

What is claimed is:

1. A bumper collision sensor comprising:
   a wire having an extendable portion in a part thereof;
   a tension sensor connected to one end of said wire; and
   a substrate that is mounted with said tension sensor and said wire and attached, with plasticity, to a bumper;
   wherein said tension sensor is fixed to one end of said substrate;
   wherein said wire is arranged in said tension sensor along a longitudinal direction of said substrate with a stress equal to or lower than a value set in advance;
   wherein the other end of said wire is fixed to said substrate; and
   wherein said extendable portion of said wire is a tension spring.

2. The bumper collision sensor of claim 1, wherein said wire is made of stainless steel.

3. A bumper collision sensor comprising:
   a wire having an extendable portion in a part thereof;
   a tension sensor connected to one end of said wire; and
   a substrate that is mounted with said tension sensor and said wire and attached, with plasticity, to a bumper;
   wherein said tension sensor is fixed to one end of said substrate;
   wherein said wire is arranged in said tension sensor along a longitudinal direction of said substrate with a stress equal to or lower than a value set in advance;
   wherein the other end of said wire is fixed to said substrate;
   wherein plural projections are formed integrally with said substrate; and
   wherein a wire holding member for holding said wire is fixed to said projections.

4. The bumper collision sensor of claim 3, wherein sections of said projections are circular.

5. The bumper collision sensor of claim 3, wherein a section of said wire holding member is circular.

6. The bumper collision sensor of claim 3, wherein
   holes are provided in a part of said wire holding member, and
   said projections pass through said holes, respectively, and said wire holding member is fixed to said projections by deformed parts of said projections.

7. The bumper collision sensor of claim 3, wherein said wire is fixed to a part of said projections formed integrally with said substrate.

8. A bumper collision sensor comprising:
   a wire having an extendable portion in a part thereof;
   a tension sensor connected to one end of said wire; and
   a substrate that is mounted with said tension sensor and said wire and attached, with plasticity, to a bumper;
   wherein said tension sensor is fixed to one end of said substrate;
   wherein said wire is arranged in said tension sensor along a longitudinal direction of said substrate with a stress equal to or lower than a value set in advance;
   wherein the other end of said wire is fixed to said substrate; and
   wherein said tension sensor includes a strain resistance element, a resistance of which changes because of distortion.

9. The bumper collision sensor of claim 8, wherein said strain resistance element comprises a printed and sintered thick-film resistor paste containing ruthenium oxide conductive particles and a glass component.

10. The bumper collision sensor of claim 8, wherein
    said tension sensor includes a detection circuit, and
    said detection circuit is formed on a stainless steel substrate together with said strain resistance element.

11. The bumper collision sensor of claim 10, wherein said detection circuit judges, when a maximum value of a changing component obtained by excluding a DC component from a change in a voltage due to a change in a resistance of said strain resistance element is within a defined range and an attenuation speed absolute value of the changing component is equal to or larger than a defined value, that the bumper has collided with a pedestrian and outputs the maximum value as a magnitude of deformation of the bumper.

12. A bumper collision sensor comprising:
    a wire having an extendable portion in a part thereof;
    a tension sensor connected to one end of said wire; and
    a substrate that is mounted with said tension sensor and said wire and attached, with plasticity, to a bumper;
    wherein said tension sensor is fixed to one end of said substrate;
    wherein said wire is arranged in said tension sensor along a longitudinal direction of said substrate with a stress equal to or lower than a value set in advance;
    wherein the other end of said wire is fixed to said substrate;

wherein said wire is one of a plurality of wires arranged in parallel and mounted with said substrate;

wherein said tension sensor is one of a plurality of tension sensors connected to respective ends of said wires; and wherein lengths of the respective wires are set to be different from one another.

13. The bumper collision sensor of claim 12, wherein said tension sensors are in parallel with each other and integrally formed.

14. The bumper collision sensor of claim 12, wherein said tension sensors include detection circuits, said detection circuits judge, when maximum values of changing components obtained by excluding DC components from changes in voltages due to changes in resistances of respective ones of said strain resistance elements are within a defined range and attenuation speed absolute values of the changing components are equal to or larger than a defined value, that the bumper has collided with pedestrians and output the maximum values as magnitudes of deformation of the bumper, and said detection circuits calculate collision positions and the number of colliding people from a value obtained by integrating the respective changing components and output the collision positions and the number of colliding people.

15. A bumper collision sensor comprising a pair of bumper collision sensors of claim 12, wherein one of said tension sensors is mounted on one end of said substrate and the other of said tension sensors is mounted on the other end of said substrate.

16. The bumper collision sensor of claim 1, wherein the substrate is the bumper.

17. The bumper collision sensor of claim 3, wherein said extendable portion of said wire is a tension spring.

18. The bumper collision sensor of claim 8, wherein said extendable portion of said wire is a tension spring.

19. The bumper collision sensor of claim 12, wherein said extendable portion of each of said wires is a tension spring.

* * * * *